(12) United States Patent
Peng (10) Patent No.: US 9,572,214 B1
(45) Date of Patent: Feb. 14, 2017

(54) LIGHT EMITTING DIODE LAMP STRING DRIVING SYSTEM

(71) Applicant: Semisilicon Technology Corp., New Taipei (TW)

(72) Inventor: Wen-Chi Peng, New Taipei (TW)

(73) Assignee: SEMISILICON TECHNOLOGY CORP., New Taipei (TW)

(*) Notice: Subject to any disclaimer, the term of this patent is extended or adjusted under 35 U.S.C. 154(b) by 0 days.

(21) Appl. No.: 14/833,640

(22) Filed: Aug. 24, 2015

(51) Int. Cl.
*H05B 33/08* (2006.01)

(52) U.S. Cl.
CPC .................................. *H05B 33/083* (2013.01)

(58) Field of Classification Search
None
See application file for complete search history.

(56) References Cited

U.S. PATENT DOCUMENTS

2008/0231203 A1* 9/2008 Budde ................ H05B 37/0263
315/186
2012/0098444 A1* 4/2012 Peng .................. H05B 33/0824
315/193
2015/0115830 A1* 4/2015 Siessegger ......... H05B 33/0803
315/291

FOREIGN PATENT DOCUMENTS

CN       203675366 U    6/2014
CN       204377212 U    6/2015

* cited by examiner

*Primary Examiner* — Douglas W Owens
*Assistant Examiner* — Dedei K Hammond
(74) *Attorney, Agent, or Firm* — Muncy, Geissler, Olds & Lowe, P.C.

(57) ABSTRACT

A light emitting diode lamp string driving system includes a plurality of light emitting diode driving apparatuses and a plurality of light emitting diode lamp strings. The light emitting diode lamp string includes a plurality of light emitting diodes. The light emitting diode driving apparatus includes a switch unit, a control unit and a voltage level generating unit. An anode of a last of the light emitting diodes of the light emitting diode lamp string connected to a first of the light emitting diode driving apparatuses is connected to the control unit of a second of the light emitting diode driving apparatuses.

10 Claims, 6 Drawing Sheets

LIGHT EMITTING DIODE LAMP STRING DRIVING SYSTEM

BACKGROUND OF THE INVENTION

Field of the Invention

The present invention relates to a lamp string driving system, and especially relates to a light emitting diode lamp string driving system.

Description of the Related Art

Currently, the light emitting diode lamp string driving system includes a plurality of light emitting diode driving apparatuses and a plurality of light emitting diode lamp strings. Each of the light emitting diode lamp string includes a plurality of light emitting diodes connected to each other in series. In order to achieve the synchronization effect or the point control effect for the light emitting diode lamp strings, each of the light emitting diodes in each of the light emitting diode lamp strings has an addressing code. The quantity of the addressing codes of the light emitting diodes in each of the light emitting diode lamp strings is equal to or less than the quantity of the light emitting diodes. For example, if the quantity of the light emitting diodes in each of the light emitting diode lamp strings is 24, the addressing codes of the light emitting diodes can be from 1 to 24, or can be 1 to 8 repeated. When lightening the light emitting diodes, the light emitting diode driving apparatus sends the control commands to drive the light emitting diodes which can interpret the control commands to light diversely.

Because each of the control commands can only drive the light emitting diodes with a specific addressing code, when the light emitting diode lamp string comprises a lot of the light emitting diodes or there are a lot of the addressing codes, the control commands will be complicated. Moreover, when the light emitting diodes are assembled, if the sequence of the light emitting diodes is incorrect, the whole light emitting diode lamp string will be determined as fail. If there are more light emitting diodes in the light emitting diode lamp string, the fail rate of the light emitting diode lamp string is higher.

SUMMARY OF THE INVENTION

In order to solve the above-mentioned problems, an object of the present invention is to provide a light emitting diode lamp string driving system.

In order to achieve the object of the present invention mentioned above, the light emitting diode lamp string driving system comprises a plurality of light emitting diode lamp strings and a plurality of light emitting diode driving apparatuses. Each of the light emitting diode lamp strings has a plurality of light emitting diodes connected to each other in series. The light emitting diode comprises an addressing code. The light emitting diode driving apparatus is electrically connected to the light emitting diode lamp string. The light emitting diode driving apparatus comprises a switch unit, a control unit, a voltage level generating unit and a first signal transmission line. The switch unit is electrically connected to the light emitting diode lamp string. The control unit has a plurality of lighting patterns. The control unit is electrically connected to the switch unit. The voltage level generating unit is electrically connected to an output side of the light emitting diode driving apparatus and the light emitting diode lamp string. One side of the first signal transmission line is electrically connected to an anode of one of the light emitting diodes of the light emitting diode lamp string electrically connected to a first of the light emitting diode driving apparatuses. The other side of the first signal transmission line is electrically connected to the control unit of a second of the light emitting diode driving apparatuses. According to a selected lighting pattern selected from the lighting patterns, the control unit of the first of the light emitting diode driving apparatuses controls on-off actions of the switch unit, so that the voltage level generating unit generates a plurality of voltages with a specific level. The first of the light emitting diode driving apparatuses outputs a first control command to the light emitting diode lamp string electrically connected to the first of the light emitting diode driving apparatuses. The light emitting diode which can interpret the first control command lightens diversely. The control unit of the first of the light emitting diode driving apparatuses sends the first control command to the control unit of the second of the light emitting diode driving apparatuses through the first signal transmission line electrically connected to the first of the light emitting diode driving apparatuses. When the control unit of the second of the light emitting diode driving apparatuses can interpret the first control command received by the second of the light emitting diode driving apparatuses, the second of the light emitting diode driving apparatuses accordingly generates a second control command and sends the second control command to the light emitting diode lamp string electrically connected to the second of the light emitting diode driving apparatuses. The light emitting diode which can interpret the second control command lightens diversely.

The advantage of the present invention is to use the first control command to drive the light emitting diode lamp string connected to the second of the light emitting diode driving apparatuses, so that the light emitting diode lamp strings connected to the light emitting diode driving apparatuses can achieve the synchronization effect or the point control effect to reduce the quantity of the light emitting diodes having the addressing codes in a single light emitting diode lamp string. The control commands are sent through the power line by the carrier method, so that the light emitting diode with two pins can be used and does not require extra signal transmission lines to save cost.

DETAILED DESCRIPTION OF THE INVENTION

Please refer to following detailed description and figures for the technical content of the present invention. The following detailed description and figures are referred for the present invention, but the present invention is not limited to it.

Figure 1:
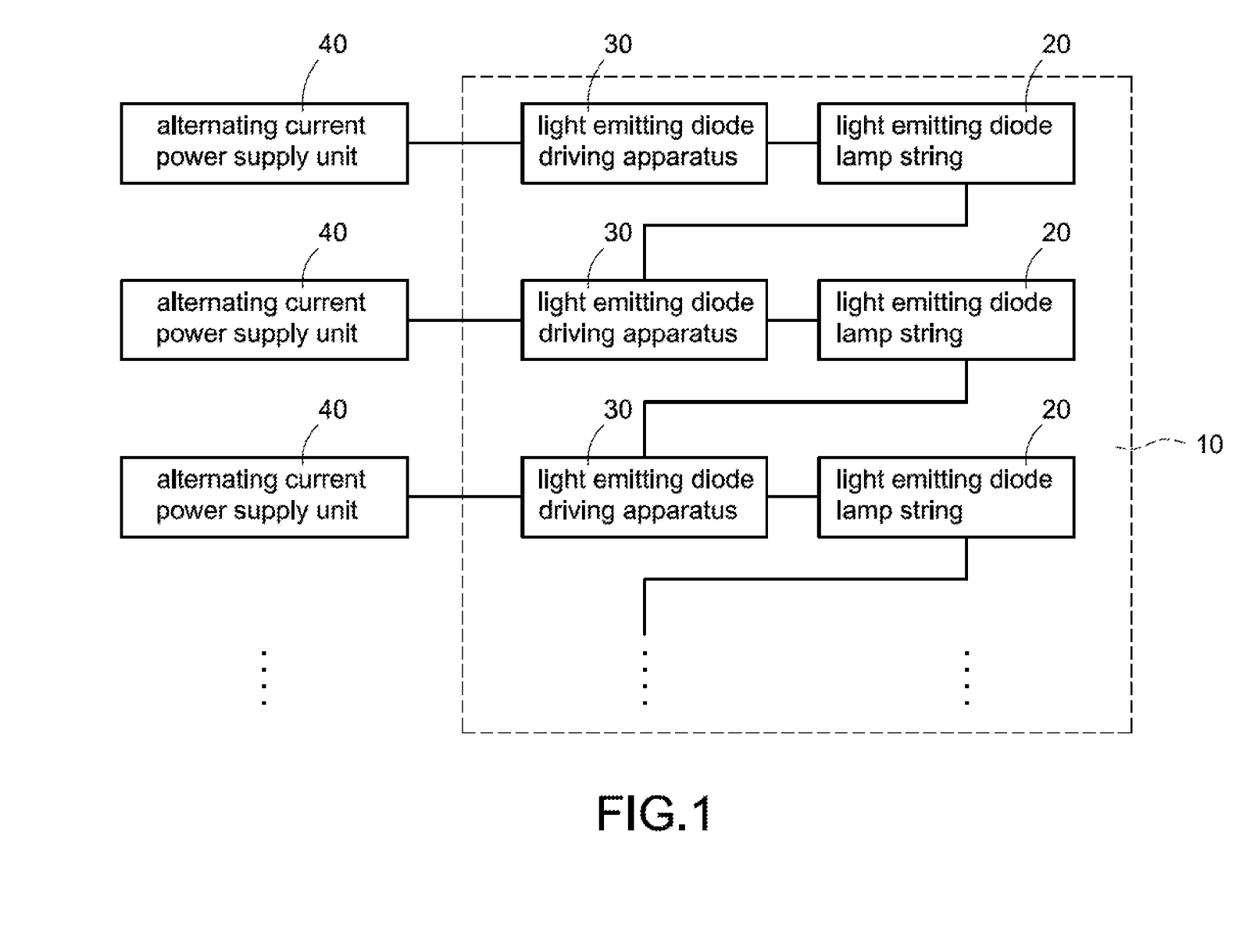
FIG. 1 shows a block diagram of the light emitting diode lamp string driving system of the present invention.
Figure 2:
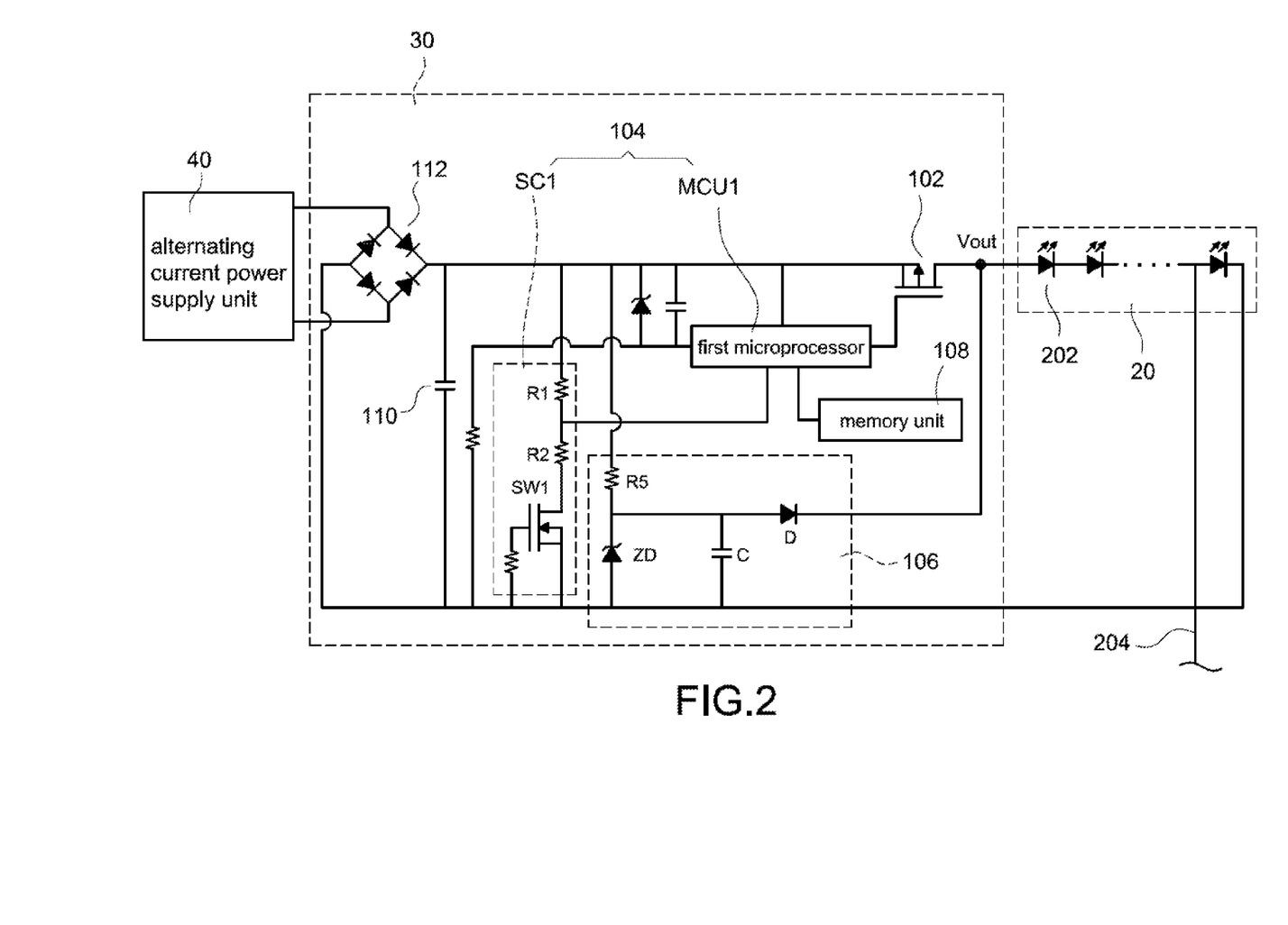
FIG. 2 shows a circuit diagram of the first of the light emitting diode driving apparatuses of the present invention.
Figure 3:
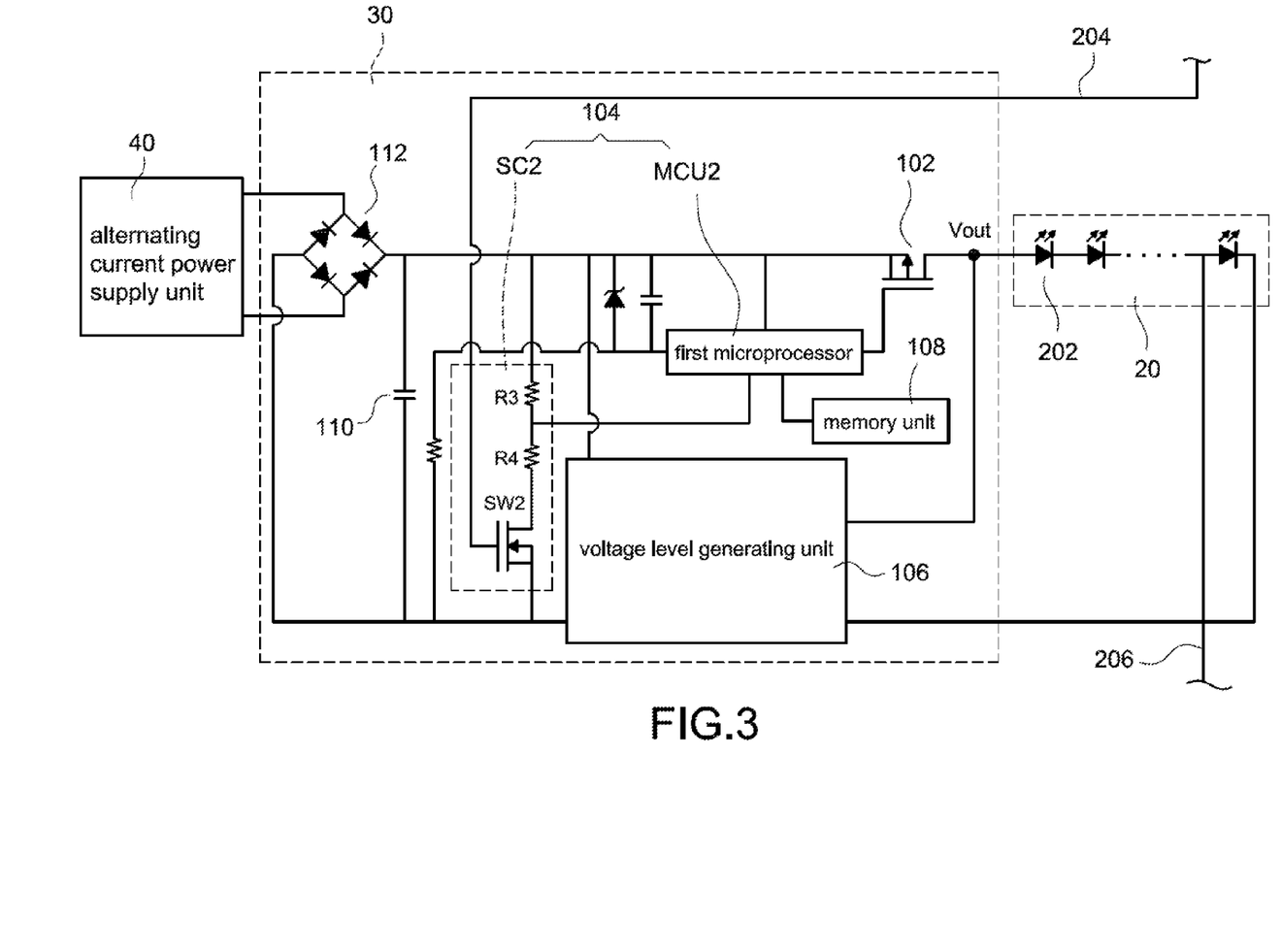
FIG. 3 shows a circuit diagram of the second of the light emitting diode driving apparatuses of the present invention.
Figure 4:
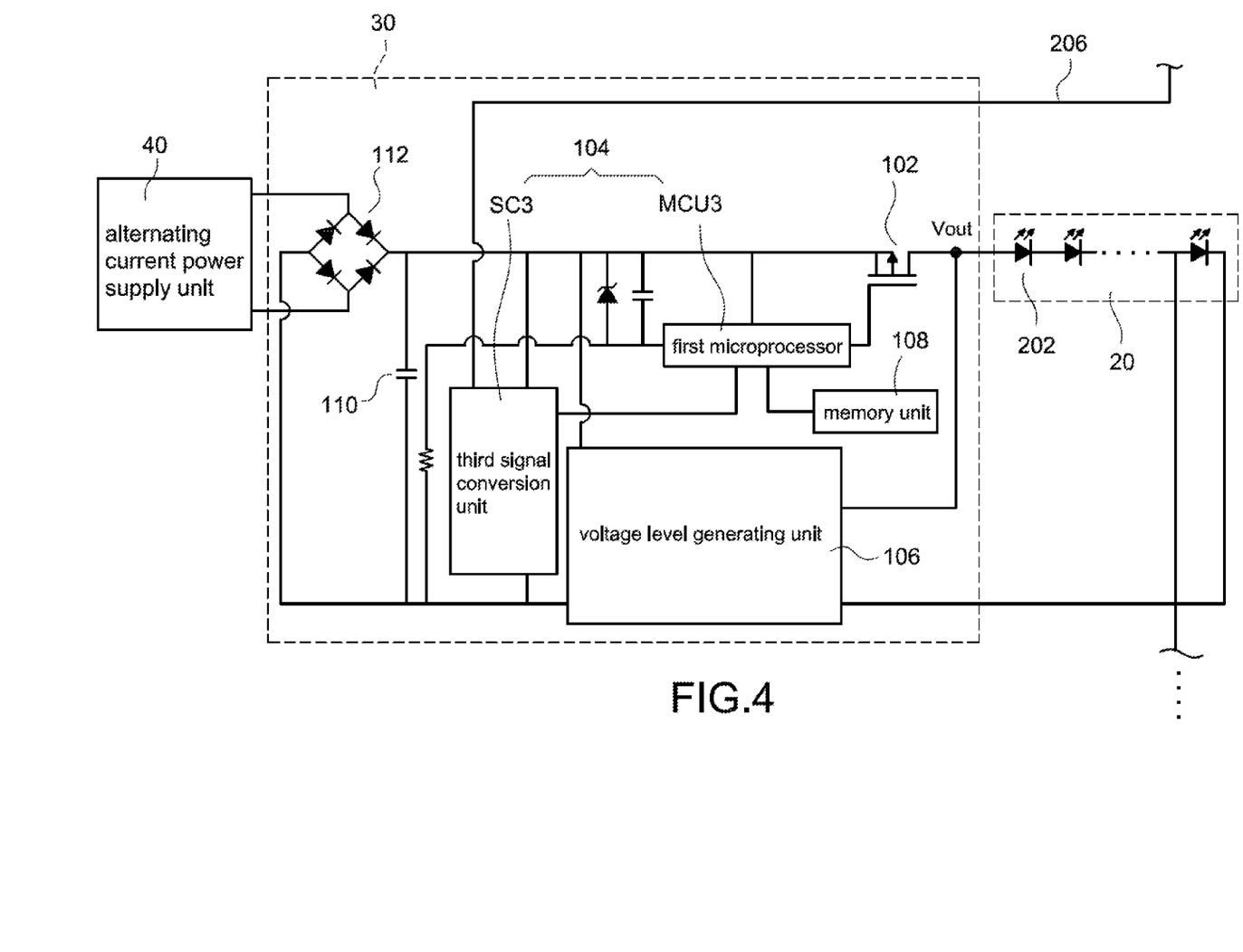
FIG. 4 shows a circuit diagram of the third of the light emitting diode driving apparatuses of the present invention.

FIG. 1 shows a block diagram of the light emitting diode lamp string driving system of the present invention. FIG. 2 shows a circuit diagram of the first of the light emitting diode driving apparatuses of the present invention. FIG. 3 shows a circuit diagram of the second of the light emitting diode driving apparatuses of the present invention. FIG. 4 shows a circuit diagram of the third of the light emitting diode driving apparatuses of the present invention. A light emitting diode lamp string driving system 10 comprises a plurality of light emitting diode lamp strings 20 and a plurality of light emitting diode driving apparatuses 30, and is applied to a plurality of alternating current power supply units 40. The light emitting diode lamp string 20 comprises a plurality of light emitting diodes 202. The light emitting diodes 202 are connected to each other in series. Each of the light emitting diodes 202 comprises an addressing code which is in accordance with the light emitting diode 202.

The light emitting diode driving apparatuses 30 are electrically connected to the light emitting diode lamp strings 20. The light emitting diode driving apparatus 30 comprises a switch unit 102, a control unit 104, a voltage level generating unit 106, a memory unit 108, a filtering unit 110 and a rectifying unit 112.

After an alternating current power sent from the alternating current power supply unit 40 is processed by the rectifying unit 112 and the filtering unit 110 (and other electronic components which are not shown in FIG. 1), the alternating current power is converted into a direct current power.

The switch unit 102 is electrically connected to the light emitting diode lamp string 20. The control unit 104 is electrically connected to the switch unit 102. The voltage level generating unit 106 is electrically connected to an output side Vout of the light emitting diode driving apparatus 30 and the light emitting diode lamp string 20. The memory unit 108 is electrically connected to the control unit 104. The filtering unit 110 is electrically connected to the switch unit 102, the control unit 104 and the voltage level generating unit 106. The rectifying unit 112 is electrically connected to the filtering unit 110.

Moreover, a first of the light emitting diode driving apparatuses 30 utilizes one side of a first signal transmission line 204 to electrically connect to an anode of a last of the light emitting diodes 202 of the light emitting diode lamp string 20 which is electrically connected to the first of the light emitting diode driving apparatuses 30. The other side of the first signal transmission line 204 is electrically connected to the control unit 104 of a second of the light emitting diode driving apparatuses 30. The second of the light emitting diode driving apparatuses 30 utilizes one side of a second signal transmission line 206 to electrically connect to an anode of a last of the light emitting diodes 202 of the light emitting diode lamp string 20 which is electrically connected to the second of the light emitting diode driving apparatuses 30. The other side of the second signal transmission line 206 is electrically connected to the control unit 104 of a third of the light emitting diode driving apparatuses 30, and so on. The light emitting diode lamp string driving system 10 of the present invention can be connected to a plurality of the light emitting diode driving apparatuses 30 and a plurality of the light emitting diode lamp strings 20.

In this embodiment, one side of the first signal transmission line 204 (or the second signal transmission line 206) is connected to the anode of the last of the light emitting diodes 202. However, the present invention is not limited to it. One side of the first signal transmission line 204 (or the second signal transmission line 206) can be connected to any one of the light emitting diodes 202 as well. However, if one side of the first signal transmission line 204 (or the second signal transmission line 206) is connected to the anode of the last of the light emitting diodes 202, a length of the first signal transmission line 204 (or the second signal transmission line 206) is the minimum.

In an embodiment, the control unit 104 of the first of the light emitting diode driving apparatuses 30 has a plurality of lighting patterns. According to a selected lighting pattern selected from the lighting patterns, the control unit 104 controls on-off actions of the switch unit 102, so that the voltage level generating unit 106 generates a plurality of voltages with a specific level, so that the first of the light emitting diode driving apparatuses 30 outputs a first control command 50 to the light emitting diode lamp string 20 which is electrically connected to the first of the light emitting diode driving apparatuses 30. The first of the light emitting diode driving apparatuses 30 utilizes the first signal transmission line 204 to send the first control command 50 to the control unit 104 of the second of the light emitting diode driving apparatuses 30.

When the light emitting diode 202 of the light emitting diode lamp string 20 which is electrically connected to the first of the light emitting diode driving apparatuses 30 can interpret the first control command 50, the light emitting diode 202 will accordingly lighten diversely. When the control unit 104 of the second of the light emitting diode driving apparatuses 30 can interpret the first control command 50, the control unit 104 of the second of the light emitting diode driving apparatuses 30 controls on-off actions of the switch unit 102, so that the voltage level generating unit 106 generates a plurality of voltages with a specific level, so that the second of the light emitting diode driving apparatuses 30 outputs a second control command 60. The second of the light emitting diode driving apparatuses 30 outputs the second control command 60 to the light emitting diode lamp string 20 which is electrically connected to the second of the light emitting diode driving apparatuses 30. The second of the light emitting diode driving apparatuses 30 utilizes the second signal transmission line 206 to send the second control command 60 to the control unit 104 of the third of the light emitting diode driving apparatuses 30, so that the light emitting diode 202 which can interpret the second control command 60 will accordingly lighten diversely, and the control unit 104 of the third of the light emitting diode driving apparatuses 30 which can interpret the second control command 60 will accordingly output a third control command 70 to drive the light emitting diode lamp string 20 which is electrically connected to the third of the light emitting diode driving apparatuses 30 to accordingly lighten diversely. Moreover, the driving principle of the third control command 70 outputted from the third of the light emitting diode driving apparatuses 30 is the same with the driving principles of the first control command 50 or the second control command 60. Therefore, it is not repeated here for brevity. According to the requirement, a plurality of the light emitting diode driving apparatuses 30 and light emitting diode lamp strings 20 can be used for the present invention.

Moreover, the memory unit 108 of each of the light emitting diode driving apparatuses 30 memorizes the lighting pattern used by the control unit 104 before shutting down. In this embodiment, the memory unit 108 of the first of the light emitting diode driving apparatus 30 is electrically connected to the first microprocessor MCU1. When the first of the light emitting diode driving apparatus 30 is turned on again, according to the memory function of the memory unit 108, the first microprocessor MCU1 will drive the light emitting diode lamp string 20 to lighten diversely by the lighting pattern used by the first microprocessor MCU1 before shutting down. Similarly, the second of the light emitting diode driving apparatuses 30 and the third of the light emitting diode driving apparatuses 30 have the same operations.

Please refer to FIG. 2 to FIG. 4. The control unit 104 of the first of the light emitting diode driving apparatuses 30 comprises a first microprocessor MCU1 and a first signal conversion unit SC1. The control unit 104 of the second of the light emitting diode driving apparatuses 30 comprises a second microprocessor MCU2 and a second signal conversion unit SC2. The control unit 104 of the third of the light emitting diode driving apparatuses 30 comprises a third microprocessor MCU3 and a third signal conversion unit SC3. The first signal transmission line 204 is electrically connected to a second conduction switch SW2 of the second signal conversion unit SC2. The second signal conversion unit SC2 is electrically connected to the second microprocessor MCU2. The second signal conversion unit SC2 converts a voltage of the first control command 50 and then sends to the second microprocessor MCU2. The second signal transmission line 206 is electrically connected to the third signal conversion unit SC3. The third signal conversion unit SC3 is electrically connected to the third microprocessor MCU3. The third signal conversion unit SC3 converts a voltage of the second control command 60 and then sends to the third microprocessor MCU3. Therefore, the problem of being unable to send the first control command 50 and the second control command 60 smoothly due to the voltage difference will be avoided.

The circuits of the first signal conversion unit SC1 and the second signal conversion unit SC2 will be described as following. The first signal conversion unit SC1 comprises a first resistor R1, a second resistor R2 and a first conduction switch SW1. The first resistor R1 is electrically connected to the filtering unit 110. The second resistor R2 is electrically connected to the first resistor R1. The first conduction switch SW1 is electrically connected to the second resistor R2 and the rectifying unit 112. The first microprocessor MCU1 is electrically connected to the first resistor R1, the second resistor R2 and the switch unit 102.

The second signal conversion unit SC2 comprises a third resistor R3, a fourth resistor R4 and a second conduction switch SW2. The third resistor R3 is electrically connected to the filtering unit 110. The fourth resistor R4 is electrically connected to the third resistor R3. The second conduction switch SW2 is electrically connected to the fourth resistor R4 and the rectifying unit 112. The second microprocessor MCU2 is electrically connected to the third resistor R3, the fourth resistor R4 and the switch unit 102. The first signal transmission line 204 is electrically connected to the second conduction switch SW2. When the first control command 50 is sent to the second conduction switch SW2 through the first signal transmission line 204, the second conduction switch SW2 is driven by the first control command 50 to be turned on and off continuously, so that the second signal conversion unit SC2 continuously outputs the voltage signals to the second microprocessor MCU2 to turn on and off the switch unit 102 which is electrically connected to the second microprocessor MCU2.

The circuit and operation method of the third signal conversion unit SC3 is the same with the circuit and operation method of the second signal conversion unit SC2. Therefore, it is not repeated here for brevity.

Please refer to FIG. 2. The voltage level generating unit 106 of each of the light emitting diode driving apparatuses 30 comprises a fifth resistor R5, a Zener diode ZD, a capacitor C and a diode D. The fifth resistor R5 is electrically connected to the filtering unit 110. The Zener diode ZD is electrically connected to the fifth resistor R5. The capacitor C is electrically connected to the fifth resistor R5. The diode D is electrically connected to the fifth resistor R5 and the output side Vout. Take the first of the light emitting diode driving apparatuses 30 as an example. When the first microprocessor MCU1 drives the switch unit 102 as "open" (namely, the switch unit 102 is turned off), the direct current power outputted from the filtering unit 110 will be outputted to the diode D through the fifth resistor R5 and the Zener diode ZD for voltage dividing, and then sent to the output side Vout, so that the voltage level generating unit 106 generates a voltage signal with a specific level until the first microprocessor MCU1 drives the switch unit 102 as "closed" (namely, the switch unit 102 is turned on). When the first microprocessor MCU1 drives the switch unit 102 as "closed" (namely, the switch unit 102 is turned on), the direct current power outputted from the filtering unit 110 will be outputted through the switch unit 102 directly. At this time, the voltage signal is back to normal. When the first microprocessor MCU1 continuously drives the switch unit 102 as "open" and "closed" repeatedly, the voltage level generating unit 106 generates a plurality of the voltage signals with the specific level. The first of the light emitting diode driving apparatuses 30 utilizes these voltage signals to output the first control command 50. The other light emitting diode driving apparatuses 30 have the same operation method.

Figure 5A:
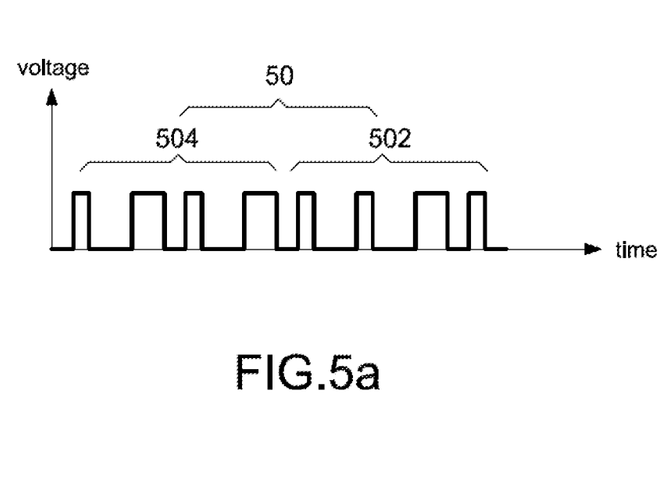
FIG. 5a shows a waveform diagram of the first control command with constant frequency control of the present invention.
Figure 5B:
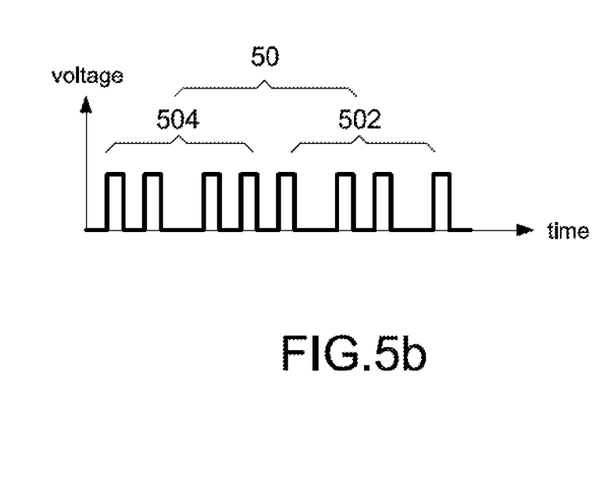
FIG. 5b shows a waveform diagram of the first control command with variable frequency control of the present invention.

FIG. 5a shows a waveform diagram of the first control command with constant frequency control of the present invention. FIG. 5b shows a waveform diagram of the first control command with variable frequency control of the present invention. The first control command 50 comprises a first light signal 502 and a first operating signal 504. Because each of the light emitting diodes 202 has the addressing code which is in accordance with the light emitting diodes 202, only the light emitting diode 202 which can interpret the first light signal 502 will lighten diversely. The first operating signal 504 is interpreted by the control unit 104 of the second of the light emitting diode driving apparatuses 30. According to the first control command 50, the second control command 60 is generated. Moreover, FIG. 5a shows the constant frequency control. In the constant frequency control, the control unit 104 controls the conduction time of the switch unit 102 to generate the first control command 50. FIG. 5b shows the variable frequency control. In the variable frequency control, the control unit 104 controls the conduction frequency of the switch unit 102 to generate the first control command 50. The sequence of the first light signal 502 and the first operating signal 504 is determined by the lighting pattern. In this embodiment, the first operating signal 504 is sent out firstly, and then the first light signal 502 is sent out, but the present invention is not limited to it. The second control command 60 has the same features with the first control command 50, and will be omitted here for brevity. The first control command 50 is, for example but not limited to, a pulse signal.

Figure 6:
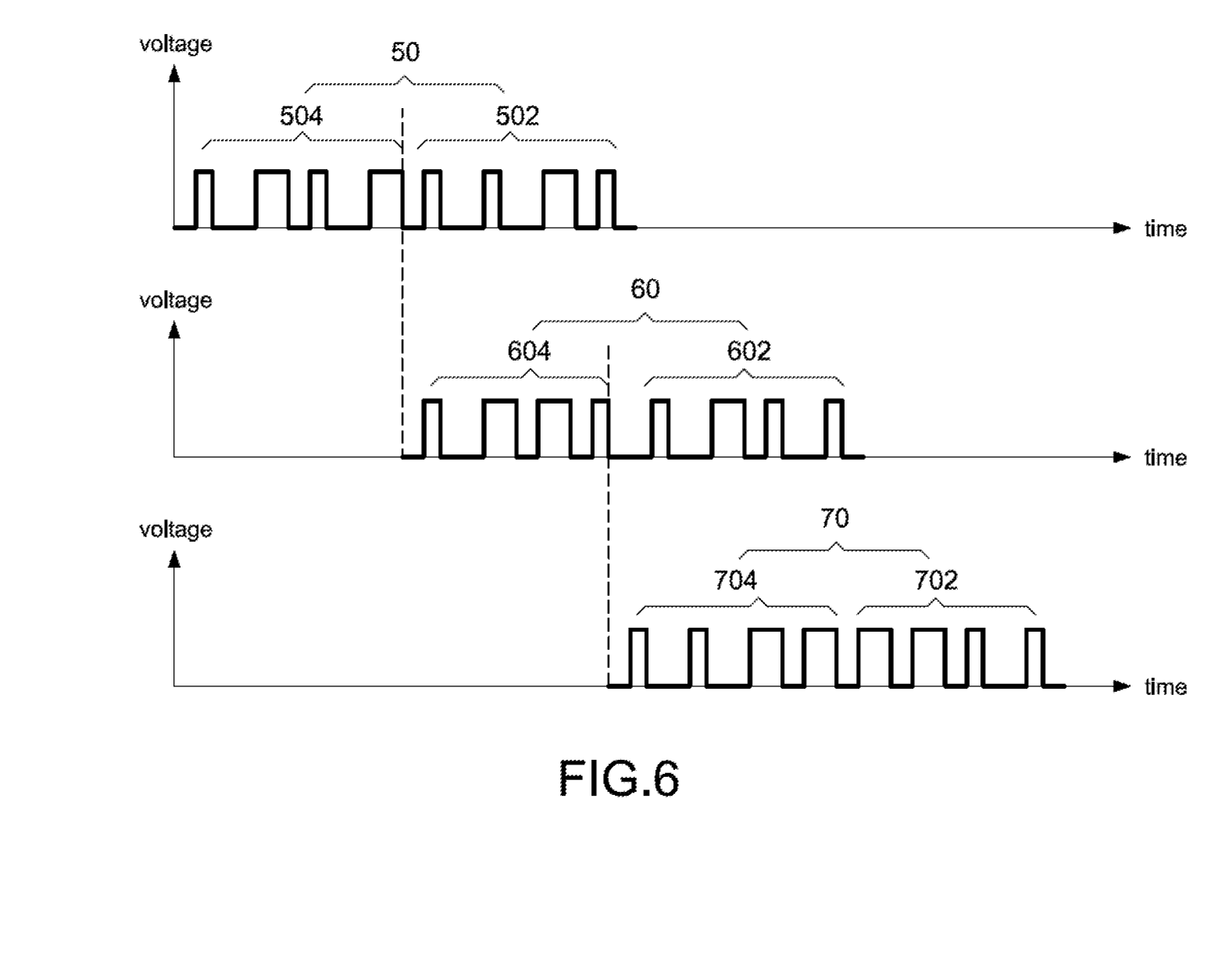
FIG. 6 shows waveform diagrams of the control commands of the first to the third of the light emitting diode driving apparatuses of the light emitting diode lamp string driving system of the present invention.

FIG. 6 shows waveform diagrams of the control commands of the first to the third of the light emitting diode driving apparatuses of the light emitting diode lamp string driving system of the present invention. Please refer to FIG. 1 to FIG. 3 as well for following description.

When the first control command 50 outputted from the first of the light emitting diode driving apparatuses 30 comprises the first light signal 502 and the first operating signal 504, the first light signal 502 is interpreted by the light emitting diode 202 which has the specific addressing code and is electrically connected to the first of the light emitting diode driving apparatuses 30, so that the light emitting diode 202 will lighten diversely according to the first light signal 502. The first operating signal 504 will be sent to the second signal conversion unit SC2 through the first signal transmission line 204. The second signal conversion unit SC2 will send the first operating signal 504 to the second microprocessor MCU2. The second microprocessor MCU2 can interpret the first operating signal 504, so that the second microprocessor MCU2 will turn on or off the switch unit 102 which is electrically connected to the second microprocessor MCU2 to send out the second control command 60. Similarly, the second control command 60 comprises a second operating signal 602 and a second light signal 604. The second light signal 604 is interpreted by the light emitting diode 202 which has the specific addressing code and is electrically connected to the second of the light emitting diode driving apparatuses 30, so that the light emitting diode 202 will lighten diversely according to the second light signal 604. The second operating signal 602 will be sent to the third signal conversion unit SC3 through the second signal transmission line 206. The third signal conversion unit SC3 will send the second operating signal 602 to the third microprocessor MCU3. The third microprocessor MCU3 can interpret the second operating signal 602, so that the third microprocessor MCU3 will turn on or off the switch unit 102 which is electrically connected to the third microprocessor MCU3 to send out the third control command 70. The third control command 70 comprises a third operating signal 702 and a third light signal 704. The rest can be done in the same manner. Therefore, the light emitting diode lamp string driving system 10 of the present invention can drive a plurality of the light emitting diode driving apparatuses 30.

The switch unit 102 is, for example but not limited to, a transistor switch, such as a PMOS. The control unit 104 is, for example but not limited to, a microprocessor or a microcontroller. The memory unit 108 is, for example but not limited to, a flash memory. The rectifying unit 112 is, for example but not limited to, a bridge rectifier.

The advantage of the present invention is to reduce the quantity of the addressing codes of the light emitting diodes 202, so that the efficiency of the back-end production management is increased and improved.

Besides, the advantage of the present invention is to send the light signal (which is used to drive the light emitting diode lamp string) and the operating signal (which is sent to the next light emitting diode driving apparatus 30 to generate the light signal which is used to drive the next light emitting diode lamp string 20) through the power line, so that the transmission lines are reduced, and the light emitting diode 202 with two pins can be used.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A light emitting diode lamp string driving system comprising:
   a plurality of light emitting diode lamp strings, each of the light emitting diode lamp strings having a plurality of light emitting diodes connected to each other in series, each of the light emitting diodes having an addressing code; and
   a plurality of light emitting diode driving apparatuses electrically connected to the light emitting diode lamp strings,
   wherein the light emitting diode driving apparatus comprises:
   a switch unit electrically connected to the light emitting diode lamp string;
   a control unit having a plurality of lighting patterns and electrically connected to the switch unit;
   a voltage level generating unit electrically connected to an output side of the light emitting diode driving apparatus and the light emitting diode lamp string; and
   a first signal transmission line, one side of the first signal transmission line electrically connected to an anode of one of the light emitting diodes of the light emitting diode lamp string connected to a first of the light emitting diode driving apparatuses, the other side of the first signal transmission line electrically connected to the control unit of a second of the light emitting diode driving apparatuses,
   wherein according to a selected lighting pattern selected from the lighting patterns, the control unit of the first of the light emitting diode driving apparatuses controls on-off actions of the switch unit, so that the voltage level generating unit generates a plurality of voltages with a specific level, so that the first of the light emitting diode driving apparatuses outputs a first control command to the light emitting diode lamp string connected to the first of the light emitting diode driving apparatuses; the light emitting diode interpreting the first control command lightens diversely;
   wherein the control unit of the first of the light emitting diode driving apparatuses sends the first control command to the control unit of the second of the light emitting diode driving apparatuses through the first signal transmission line electrically connected to the first of the light emitting diode driving apparatuses; when the control unit of the second of the light emitting diode driving apparatuses interprets the first control command received by the second of the light emitting diode driving apparatuses, the second of the light emitting diode driving apparatuses accordingly generates a second control command and sends the second control command to the light emitting diode lamp string electrically connected to the second of the light emitting diode driving apparatuses; the light emitting diode interpreting the second control command lightens diversely.

2. The light emitting diode lamp string driving system in claim 1, wherein the control unit of the first of the light emitting diode driving apparatuses comprises a first microprocessor and a first signal conversion unit; the first signal conversion unit is electrically connected to the first microprocessor; the control unit of the second of the light emitting diode driving apparatuses comprises a second signal conversion unit and a second microprocessor; the second microprocessor is electrically connected to the first signal conversion unit; the first signal transmission line is electrically connected to the second signal conversion unit, so that the first control command received by the second signal conversion unit is processed with voltage conversion and then sent to the second microprocessor.

3. The light emitting diode lamp string driving system in claim 2, further comprising a second signal transmission line; one side of the second signal transmission line is electrically connected to an anode of one of the light emitting diodes of a second of the light emitting diode lamp strings; the other side of the second signal transmission line is electrically connected to the control unit of a third of the light emitting diode driving apparatuses; the control unit of the third of the light emitting diode driving apparatuses comprises a third signal conversion unit and a third microprocessor; the second signal transmission line is electrically connected to the third signal conversion unit, so that the second control command received by the third signal conversion unit is processed with voltage conversion and then sent to the third microprocessor.

4. The light emitting diode lamp string driving system in claim 3, wherein the first control command comprises a first operating signal and a first light signal; the second microprocessor interprets the first operating signal; the light emitting diode electrically connected to the first of the light emitting diode driving apparatuses interprets the first light signal; the second control command comprises a second operating signal and a second light signal; the third microprocessor interprets the second operating signal; the light emitting diode electrically connected to the second of the light emitting diode driving apparatuses interprets the second light signal.

5. The light emitting diode lamp string driving system in claim 4, wherein one side of the first signal transmission line is electrically connected to an anode of a last of the light emitting diodes of the light emitting diode lamp string electrically connected to the first of the light emitting diode driving apparatuses; one side of the second signal transmission line is electrically connected to an anode of a last of the light emitting diodes of the light emitting diode lamp string electrically connected to the second of the light emitting diode driving apparatuses.

6. The light emitting diode lamp string driving system in claim 1, wherein the control unit of the first of the light emitting diode driving apparatuses and the control unit of the second of the light emitting diode driving apparatuses control their respective switch units with constant frequency control; the control unit controls a conduction time of the switch unit to generate the first control command and the second control command.

7. The light emitting diode lamp string driving system in claim 1, wherein the control unit of the first of the light emitting diode driving apparatuses and the control unit of the second of the light emitting diode driving apparatuses control their respective switch units with variable frequency control; the control unit controls a conduction frequency of the switch unit to generate the first control command and the second control command.

8. The light emitting diode lamp string driving system in claim 1, wherein the light emitting diode driving apparatus further comprises:
 a filtering unit electrically connected to the switch unit, the control unit and the voltage level generating unit; and
 a rectifying unit electrically connected to the filtering unit.

9. The light emitting diode lamp string driving system in claim 8, wherein the light emitting diode driving apparatus further comprises a memory unit electrically connected to the control unit; the memory unit stores the lighting pattern used by the control unit before shutting down.

10. The light emitting diode lamp string driving system in claim 9, wherein the switch unit is a transistor switch; the memory unit is a flash memory; and the rectifying unit is a bridge rectifier.

* * * * *